Oct. 23, 1951     C. H. BELL     2,572,689
SEAT CUSHION ASSEMBLY
Filed April 30, 1948     3 Sheets—Sheet 2
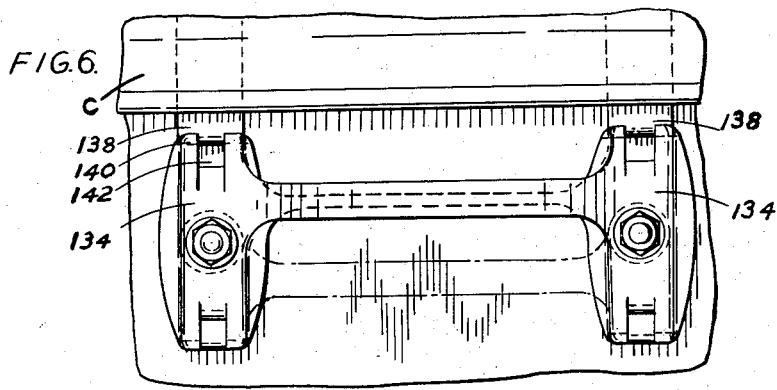
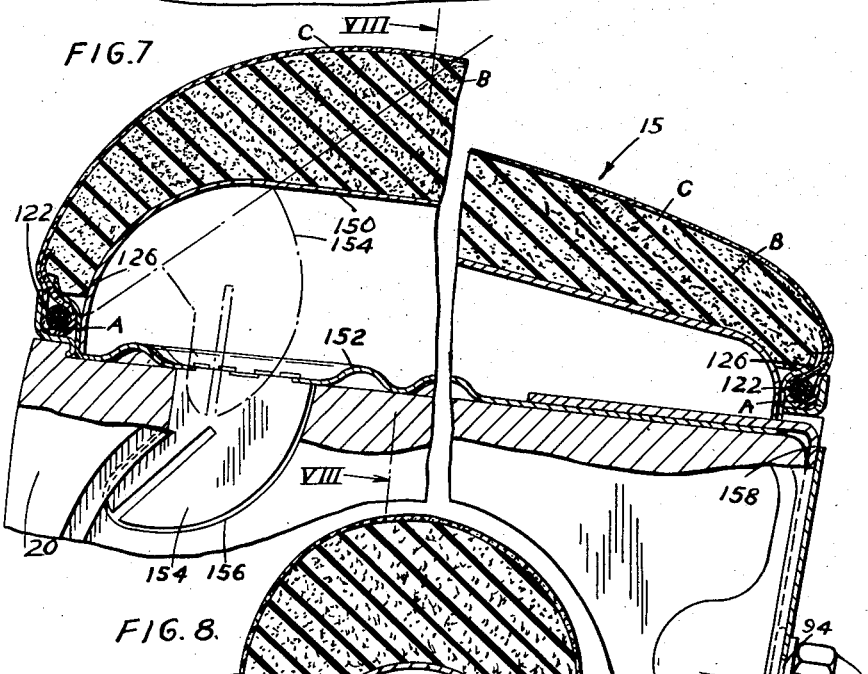
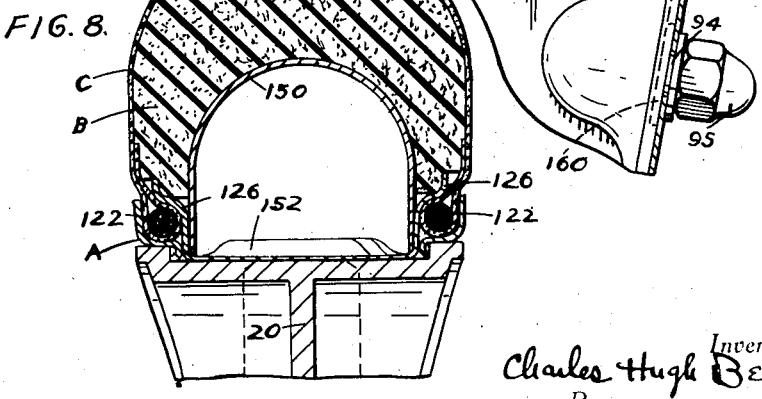
Inventor
Charles Hugh Bell
By
Dowell & Dowell
Attorneys

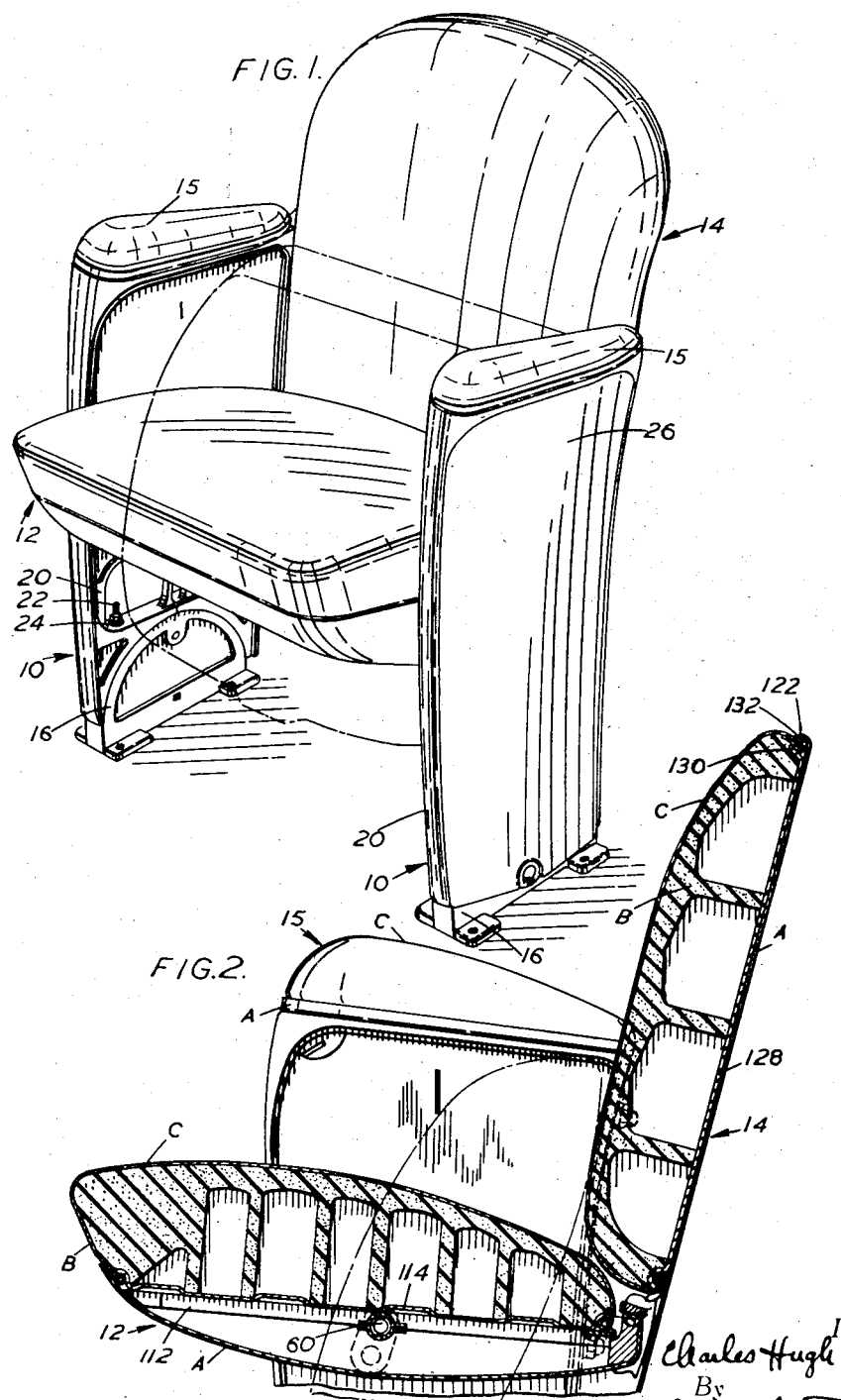

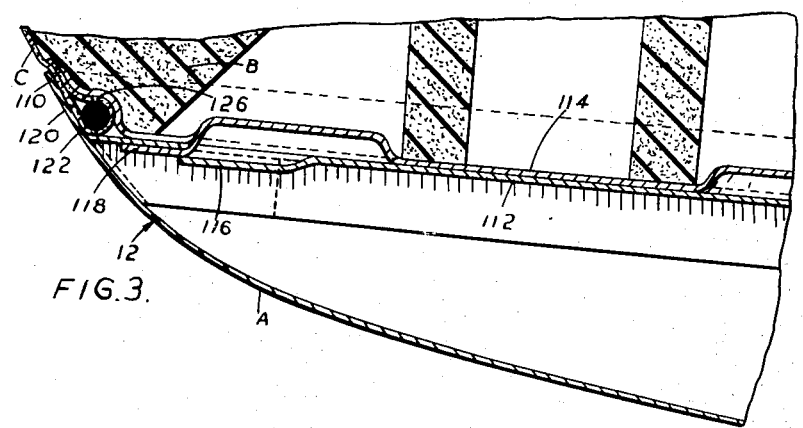
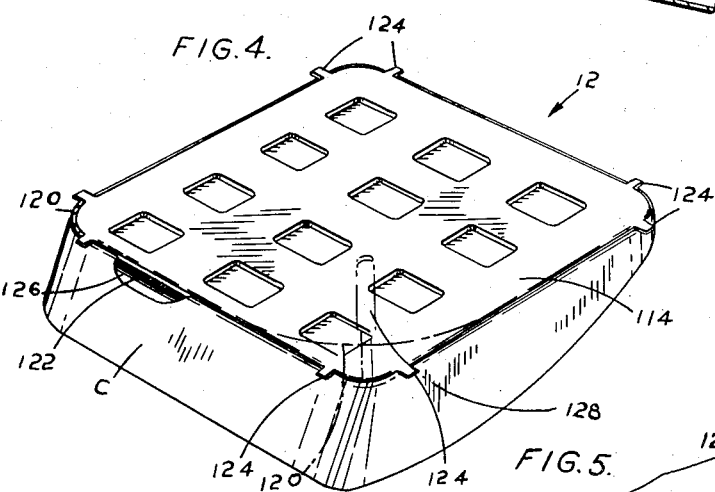
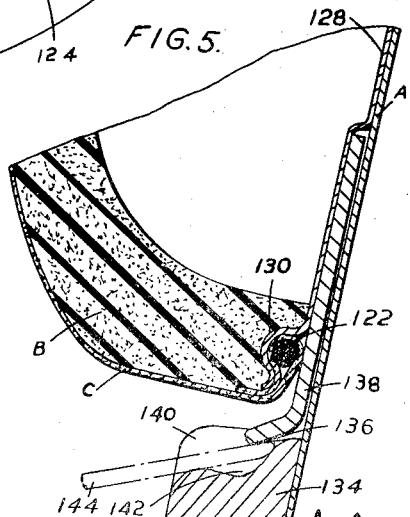

Patented Oct. 23, 1951

2,572,689

UNITED STATES PATENT OFFICE 2,572,689

SEAT CUSHION ASSEMBLY

Charles Hugh Bell, London, England, assignor to Gaumont Kalee Seating Limited, London, England Application April 30, 1948, Serial No. 24,283

6 Claims. (Cl. 155—183)

This invention relates to furniture and particularly to theatre chairs.

A serious objection to upholstered furniture particularly in theatres, cinemas, concert halls and like public places is that the upholstery cannot readily be cleaned. It thus harbours dirt which can be injurious to health and is also visually unpleasant. Furthermore, when renewal is required, stripping and re-covering are expensive operations.

One solution of the problem lies in the use of loose covers which can, when occasion demands, be removed and cleaned. Such loose covers, however, are objectionable because of the difficulty of keeping them properly in position when in use, while allowing them to be readily removed and replaced.

According to the invention, a chair cushion assembly comprises a rigid part and a resilient part which are removable from each other, in which the resilient part is covered by a loose cover which is held positively in position by the co-operation of the two parts.

This can be contrived by providing the loose cover with a restricted opening, the edge of which is thickened and is substantially inexpansible and which edge, when the cover is in use, lies in a space between the article which it covers and a part which supports the article and out of which space it cannot be removed except by removing the article from the support.

The invention when applied to a theatre chair can be used for the seat, the back and the arm pads, each of these articles being made so that it will fit into or on a supporting "pan" or the like. The edge of the loose cover which bounds the restricted opening is preferably formed as a hem in which an endless wire or cable is housed. The cushion on which the loose cover has to be placed can usefully be provided on its underside with lugs or the like under or round which the wire or cable can be sprung so that the cover is held tightly on to the cushion. For supporting the cushion a pan or the like is provided, having an edge which when the cushion is in place on it, comes close to the outer surfaces of the cushion itself and, together with those surfaces, defines a space in which the thickened edge, that is to say, the hem containing the wire or cable is imprisoned so that it cannot be moved without removal of the cushion as a whole.

In order that the invention may be thoroughly understood and be more readily carried into effect, an example of a theatre chair having loose seat, back and arm pad covers in accordance with it will now be described with reference to the accompanying drawings in which:

Figure 1 is a general perspective view of the chair;

Figure 2 is a partial central sectional elevation of the chair shown in Fig. 1;

Figure 3 is an enlargement of part of Fig. 2;

Figure 4 is an underneath perspective view of the seat cushion of the chair;

Figure 5 is an enlargement of part of Fig. 2 illustrating the construction of the back of the chair;

Figure 6 is a front elevation of part of Fig. 5;

Figure 7 is a longitudinal section through an arm pad; and

Figure 8 is a section taken on the line VIII—VIII in Fig. 7.

The chair shown in Figure 1 is of the kind shown and described in my co-pending patent applications Nos. 24,281, now abandoned and 24,282, both filed April 30, 1948. It has a pair of side standards 10 made up of two parts 16 and 20 which can be adjusted relatively to each other by means of bolts 22 and 24. A seat 12 and a back 14 are supported by the side standards and arm pads 15 are provided as shown on the upper parts 20 of the side standards.

The seat 12, the back 14 and the arm pads 15 are all, basically constructed in the same way, each having a pan or the like A in or on which is supported a cushion B having a removable cover C.

The construction of the seat is shown particularly in Figs. 2, 3 and 4.

The seat pan A is of sheet metal and is provided with bearings 60 co-operating with complementary parts on the standards as shown and described in my patent application No. 24,282, supra. A little below its rim 110 it has a platform 112 on which rests the upholstered part of the seat. The upholstered part consists of a base 114 to which is attached a rubber cushion B covered by a loose fabric cover C. The platform 112 has tongues 116 pressed out of it to form slots into which tongues 118 in the cushion base 114 can be engaged as shown in Fig. 3.

The cover C is a single piece of fabric having a hem 120 in which is housed an endless, substantially inextensible cord 122. The cord is preferably, as shown in the drawings, a wire cable. The cover is shaped to fit the cushion B, but the opening in the cover as defined by the cable 122 is restricted so that the cushion B must be warped to be inserted in the cover C, although, once inserted, it may resume its normal shape as shown in Fig. 4.

As will be seen in Fig. 4, the seat base 114 has near each corner a pair of lugs 124. The cover C can easily be engaged over the cushion so that its thickened edge 120 formed by the cable lies between the flange 126 and the lugs 124 at three of the corners and cuts across the remaining corner as shown in chain dotted lines in Fig. 4. To engage the thickened edge beneath the remaining pair of lugs, a lever is used as shown at 128 in Fig. 4.

When the cushion B on its base 114 and covered with its cover C is mounted on the pan platform 112, the thickened edge 120 of the cover is imprisoned (see Fig. 3) in a space bounded by the rim 110 of the pan, the pan platform 112 and the flange 126 of the cushion base 114. The flange 126 is shaped so that the opening between it and the rim 110 is too small to allow the cable 122 to pass through it. The cover is thus held securely in position. It does not suffer from the very common defect of loose covers of creeping and becoming unsightly as a result of use. It can, nevertheless, be very easily removed. To remove it, the cushion is first removed from the pan by a simple backward and upward movement. The cover is then levered over the lugs 124 at one corner in much the same way as that way in which a bicycle tyre is removed from its rim, whereupon its complete removal can be effected with the utmost ease.

The construction of the back is shown in Figs. 2, 5 and 6.

The back pan A is in the form of a panel which is carried, as described in my patent application Serial No. 24,282 by studs 94 (Fig. 7) on the side standards. The cushion B is attached to a base 128 and is covered by a loose fabric cover C. The base 128 has a flange 130 and lugs (not shown) corresponding to the flange 126 and the lugs 124 of the seat cushion base 114. The cover C, like the seat cushion cover, has a restricted opening defined by a thickened edge formed by an endless cable 122. It is mounted on the back cushion in the manner described in connection with the seat cushion cover.

The back panel A has its upper edge turned over as shown at 132 in Fig. 2 so as partially to embrace the thickened edge of the loose cover formed by the cable 122. The side edges of the back panel which are not shown in the drawings are similarly turned over so that the cable 122 is imprisoned along the upper and the side edges of the back panel in a space bounded by the turned-over edge 132 of the back panel, the back panel proper and the flange 130 of the cushion base 128.

A little beneath the lower edge of the back cushion, the back panel A has fixed to it a pair of stops 134 (Fig. 5) which, as shown, form part of the seat stop described in my patent application Serial No. 24,292, now Patent No. 2,497,114, granted February 14, 1950, but which may be provided specially for the purpose now to be described. These stops have grooves 136 in their upper faces in which tongues 138 depending from the back cushion base 128 can be engaged. The ends of the tongues are bent over and the front edges 140 of the stop are rounded. To mount the back cushion assembly on the back panel, its upper edge is first engaged beneath the lip 132 of the back panel and the cushion is pressed firmly towards the panel. The tongues 138 are thus caused to ride over the rounded front edges 140 of the stops 134 and to snap into the grooves 136. In order to remove the back cushion, the tongues are levered out of the grooves 136 in the manner indicated in Fig. 5, slots 142 being provided in the stop 134 to facilitate the insertion of a lever 144.

This method of mounting the loose cover on the back cushion has the same advantages as those mentioned in connection with the seat cover.

The construction of the arm pads 15 is shown particularly in Figs. 7 and 8.

Each arm pad assembly is made up of a pan A, a cushion B and a loose cover C. The pan is this case is in the form of a ring. The cushion B is attached to a supporting member 150 which is attached to a base 152. The base 152 has a flange 126 corresponding to the flange 126 of the seat cushion base 114 and the back cushion base 128. The cover C as in the case of the seat and back cushions has a restricted opening the edge of which is thickened by a cable 122. This thickened edge lies in a space bounded by the flange 126 and the pan A and the cover C cannot be moved unless the cushion B and its base 128 are removed from the pan.

The arm pad assembly is held in position on the upper part 20 of a side standard by the means provided for attaching the back to the standards. As shown in Fig. 7, the base 152 has depending from it a tongue 154 and the standard has an opening 156 in its upper face. To mount the arm pad assembly on the standard, the tongue 154 is inserted in the opening 156 as shown in chain dotted lines in Fig. 7. The rear of the assembly is then pressed down on to the standard so that a tongue 158 attached to the base 152 lies against the rear face of the standard. The outer end 160 of this tongue is forked and straddles the stud 94 which projects from the rear of the standard. The assembly is then held firmly in position by tightening the cap nut 95 on the stud 94. The tongue 154 has a slot 160 in it to enable its shape to be adjusted to that of the opening 156.

I claim:

1. In a chair or seat, one or more removable cushions each comprising a rigid base and an upholstered part carried thereby, said base having a peripheral flange; a rigid pan receiving said base and removably connected thereto, said pan having a complementary rim normally spaced from the flange and forming with the flange a peripheral pocket having a restricted mouth; and a cover on the exposed area of said upholstered part entering the restricted mouth and having a thickened marginal portion confined in the pocket, said marginal portion being of such thickness that same cannot pass through the mouth when the pan and base are connected together.

2. In a chair or seat as set forth in claim 1, said thickened portion comprising a hem; and an endless non-stretchable cord housed in the hem.

3. In a chair or seat as set forth in claim 1, said thickened portion comprising a hem; and an endless non-stretchable cord housed in the hem, said cord being of substantially same length as that of the said pocket but of less length than the outer periphery of the upholstered part and forceable thereover.

4. In a chair or seat, one or more removable cushions each comprising a rigid base and an upholstered part carried thereby, said base having a peripheral flange; a rigid pan receiving said base and removably connected thereto, said pan having a complementary rim normally spaced from the flange and forming with the flange a peripheral pocket having a restricted mouth; and a flexible bag-shaped cover on said upholstered part tailored to fit the part of the upholstered part that is visible, said cover entering the restricted mouth and having a thickened marginal portion confined in the pocket, said marginal portion being of such thickness that same cannot pass through the mouth when the pan and base are connected together.

5. In a chair or seat as set forth in claim 4, said thickened portion comprising a hem; and an endless non-stretchable cord housed in the hem.

6. In a chair or seat as set forth in claim 4, said thickened portion comprising a hem; and an endless non-stretchable cord housed in the hem, said cord being of substantially same length as that of the said pocket but of less length than the outer periphery of the upholstered part and forceable thereover.

CHARLES HUGH BELL.

REFERENCES CITED

The following references are of record in the file of this patent:

UNITED STATES PATENTS

| Number | Name | Date |
| --- | --- | --- |
| 2,107,052 | Church | Feb. 1, 1938 |
| 2,192,070 | Cramer | Feb. 27, 1940 |